(12) United States Patent
Mukhopadhyay et al.

(10) Patent No.: US 9,037,960 B2
(45) Date of Patent: May 19, 2015

(54) MONITORING AND TRACKING APPLICATION USAGE

(75) Inventors: Tanmoy Mukhopadhyay, Bangalore (IN); Venumadhava Ganapaya Bhat, Taguig (PH)

(73) Assignee: Accenture Global Services Limited, Dublin (IE)

( * ) Notice: Subject to any disclaimer, the term of this patent is extended or adjusted under 35 U.S.C. 154(b) by 484 days.

(21) Appl. No.: 12/967,916

(22) Filed: Dec. 14, 2010

(65) Prior Publication Data

US 2011/0173525 A1    Jul. 14, 2011

(30) Foreign Application Priority Data

Dec. 15, 2009   (EP) ..................................... 09015523

(51) Int. Cl.
*G06F 17/00*    (2006.01)
*G06F 11/34*    (2006.01)
*H04L 12/24*    (2006.01)
*G06F 3/0488*   (2013.01)
(Continued)

(52) U.S. Cl.
CPC ............. *G06F 11/3438* (2013.01); *H04L 41/22* (2013.01); *H04L 41/145* (2013.01); *G06F 3/04883* (2013.01); *G06F 17/24* (2013.01); *G06F 3/0488* (2013.01); *H04L 41/12* (2013.01); *G06F 3/048* (2013.01); *G06F 17/21* (2013.01); *H04L 29/0899* (2013.01); *G06F 17/30905* (2013.01); *G06F 11/3409* (2013.01); *G06F 11/3466* (2013.01); *G06F 11/3476* (2013.01); *G06F 2201/865* (2013.01)

(58) Field of Classification Search
CPC ... G06F 17/24; G06F 17/21; G06F 17/30905; G06F 3/048; G06F 3/04883; G06F 3/0488; H04L 41/12; H04L 41/22; H04L 29/0899; H04L 41/145; H04L 3/0481
USPC .......... 715/781, 212, 273, 736, 700; 702/187; 345/789; 726/26; 709/224
See application file for complete search history.

(56) References Cited

U.S. PATENT DOCUMENTS 6,167,358 A  * 12/2000 Othmer et al. ................ 702/188
6,978,303 B1 * 12/2005 McCreesh et al. ............ 709/224
(Continued)

FOREIGN PATENT DOCUMENTS

EP    0 938 036 A2    5/1999
EP    0 938 036       8/1999
(Continued)

OTHER PUBLICATIONS

Extended European Search Report, Sep. 13, 2011.
(Continued)

*Primary Examiner* — Quoc A Tran
(74) *Attorney, Agent, or Firm* — Brinks Gilson & Lione (57) ABSTRACT

The present description refers to a computer-implemented method, a computer program product and a computer system for monitoring and tracking application usage, the method comprising: determining, during a first interval, a first indication of whether a first user has provided a first input. The method further comprising obtaining, during the first interval, a first identifier of an active window in a first graphical user interface (GUI), and selectively storing the first identifier and the first indication. For this purpose a specific tracking tool may be implemented on the computer on which the first graphical user interface is executed.

29 Claims, 9 Drawing Sheets

| Date & Time | | Window (Idle/Working) | |
|---|---|---|---|
| 11/30/2010 | 17:53:45 | Working - Microsoft Excel - Customer_Example_spreadhsheet.xls | 00:00:05 |
| 11/30/2010 | 17:53:50 | Working - Enterprise Sign On - Microsoft Internet Explorer | 00:00:05 |
| 11/30/2010 | 17:53:55 | Working - Connect to ts1.company.com | 00:00:45 |
| 11/30/2010 | 17:54:40 | Working - Enterprise Sign On - Microsoft Internet Explorer | 00:00:05 |
| 11/30/2010 | 17:54:45 | Working - Attendance Time In - Microsoft Internet Explorer | 00:00:05 |
| 11/30/2010 | 17:54:50 | Working - Attendance Time In - New Item - Microsoft Internet Explorer | 00:00:15 |
| 11/30/2010 | 17:55:05 | Working - Attendance Time In - Microsoft Internet Explorer | 00:00:05 |
| 11/30/2010 | 17:55:10 | Working - Media Application Portal - Microsoft Internet Explorer | 00:00:15 |
| 11/30/2010 | 17:55:25 | Working - Presentation Server - Microsoft Internet Explorer | 00:00:05 |
| 11/30/2010 | 17:55:30 | Idle - Remote Application Runtime | 00:00:05 |
| 11/30/2010 | 17:55:35 | Idle - Media Desktop SAPI | 00:00:05 |
| 11/30/2010 | 17:55:40 | Idle - Remote Application Runtime | 00:00:10 |
| 11/30/2010 | 17:55:50 | Idle - Media Desktop SAPI - online plug-in | 00:00:05 |
| 11/30/2010 | 17:55:55 | Working - Media Desktop SAPI | 00:00:05 |
| 11/30/2010 | 17:56:00 | Idle - Media Desktop SAPI - online plug-in | 00:00:05 |
| 11/30/2010 | 17:56:05 | Working - U:\Team\CUTT Tool | 00:00:05 |
| 11/30/2010 | 17:56:10 | Working - U:\Team\Weekly Trackers | 00:00:05 |
| 11/30/2010 | 17:56:15 | Working - U:\Team\Weekly Trackers | 00:00:05 |
| 11/30/2010 | 17:56:20 | Idle - U:\Team\Weekly Trackers | 00:00:05 |
| 11/30/2010 | 17:56:25 | Idle - Media Desktop SAPI ERROR | 00:00:05 |
| 11/30/2010 | 17:56:30 | Working - Media Desktop SAPI - online plug-in | 00:00:05 |
| 11/30/2010 | 17:56:35 | Idle - Media Desktop SAPI - online plug-in | 00:00:45 |
| 11/30/2010 | 17:57:20 | Working - Media Desktop SAPI - online plug-in | 00:00:05 |
| 11/30/2010 | 17:57:25 | Idle - Media Desktop SAPI - online plug-in | 00:00:05 |
| 11/30/2010 | 17:57:30 | Working - Media Desktop SAPI - online plug-in | 00:00:45 |
| 11/30/2010 | 17:58:15 | Working - Presentation Server - Microsoft Internet Explorer | 00:00:05 |
| 11/30/2010 | 17:58:20 | Working - Microsoft Exchange - Outlook Web Access - Microsoft Internet Explorer | 00:00:10 |
| 11/30/2010 | 17:58:30 | Working - Customer - Outlook Web Access - Microsoft Internet Access | 00:00:05 |
| 11/30/2010 | 17:58:35 | Idle - https://email.company.com - Maxicare Update: Company Dedicated Hotline | 00:00:45 |
| 11/30/2010 | 17:59:20 | Working - Media Desktop SAPI - online plug-in | 00:00:38 |

(51) Int. Cl.
  *G06F 17/24* (2006.01)
  *G06F 3/048* (2013.01)
  *G06F 17/21* (2006.01)
  *H04L 29/08* (2006.01)
  *G06F 17/30* (2006.01)

(56) References Cited

U.S. PATENT DOCUMENTS

| | | | |
|---|---|---|---|
| 2001/0003172 A1 | 6/2001 | Skinner et al. | |
| 2001/0054026 A1* | 12/2001 | Choate | 705/52 |
| 2003/0090525 A1 | 5/2003 | Hughes et al. | |
| 2005/0183143 A1* | 8/2005 | Anderholm et al. | 726/22 |
| 2006/0236236 A1* | 10/2006 | Wilbrink et al. | 715/530 |
| 2008/0005319 A1* | 1/2008 | Anderholm et al. | 709/224 |
| 2008/0215722 A1* | 9/2008 | Hogaboom et al. | 709/224 |
| 2009/0193360 A1* | 7/2009 | Escuer | 715/810 |
| 2010/0198879 A1* | 8/2010 | Flores et al. | 707/802 |

FOREIGN PATENT DOCUMENTS

| | | | |
|---|---|---|---|
| EP | 1 246 269 A2 | 8/2000 | |
| EP | 1 246 069 A2 | 10/2002 | |
| WO | WO 2009/050464 A1 | 4/2009 | |
| WO | WO 2009/050464 A2 | 4/2009 | |

OTHER PUBLICATIONS

Examiner's Report from corresponding Canadian Patent Application No. 2,725,274, dated Apr. 24, 2014.

* cited by examiner

| 301 | 303 | 305 | 307 |
|---|---|---|---|
| 06.22.2009 12:26:03 | Microsoft Excel - CUTE V1.xls | Working | 0:00:05 |
| 06.22.2009 12:26:08 | Microsoft Excel - CUTE V1.xls | Working | 0:00:05 |
| 06.22.2009 12:26:13 | Microsoft Excel - CUTE V1.xls | Working | 0:00:05 |
| 06.22.2009 12:26:18 | Microsoft Excel - CUTE V1.xls | Working | 0:00:05 |
| 06.22.2009 12:26:23 | Microsoft Excel - CUTE V1.xls | Idle | 0:00:05 |
| 06.22.2009 12:26:28 | Microsoft Excel - CUTE V1.xls | Idle | 0:00:05 |
| 06.22.2009 12:26:33 | Microsoft Excel - CUTE V1.xls | Working | 0:00:05 |
| 06.22.2009 12:26:38 | Inbox - Microsoft Outlook | Working | 0:00:05 |
| 06.22.2009 12:26:43 | Inbox - Microsoft Outlook | Idle | 0:00:05 |
| 06.22.2009 12:26:48 | Inbox - Microsoft Outlook | Idle | 0:00:05 |
| 06.22.2009 12:26:53 | Inbox - Microsoft Outlook | Idle | 0:00:05 |
| 06.22.2009 12:26:58 | Inbox - Microsoft Outlook | Working | 0:00:05 |
| 06.22.2009 12:27:03 | Inbox - Microsoft Outlook | Working | 0:00:05 |
| 06.22.2009 12:27:08 | Inbox - Microsoft Outlook | Idle | 0:00:05 |
| 06.22.2009 12:27:13 | Inbox - Microsoft Outlook | Idle | 0:00:05 |
| 06.22.2009 12:27:18 | Inbox - Microsoft Outlook | Working | 0:00:05 |
| 06.22.2009 12:27:23 | Inbox - Microsoft Outlook | Working | 0:00:05 |
| 06.22.2009 12:27:28 | Inbox - Microsoft Outlook | Idle | 0:00:05 |
| 06.22.2009 12:27:33 | Inbox - Microsoft Outlook | Idle | 0:00:05 |
| 06.22.2009 12:27:38 | Inbox - Microsoft Outlook | Idle | 0:00:05 |
| 06.22.2009 12:27:43 | Inbox - Microsoft Outlook | Idle | 0:00:05 |
| 06.22.2009 12:27:48 | Inbox - Microsoft Outlook | Working | 0:00:05 |
| 06.22.2009 12:27:53 | Microsoft Excel - CUTE V1.xls | Idle | 0:00:05 |
| 06.22.2009 12:27:58 | Microsoft Excel - CUTE V1.xls | Idle | 0:00:05 |
| 06.22.2009 12:28:03 | Microsoft Excel - CUTE V1.xls | Idle | 0:00:05 |
| 06.22.2009 12:28:08 | Microsoft Excel - CUTE V1.xls | Working | 0:00:05 |
| 06.22.2009 12:28:13 | Inbox - Microsoft Outlook | Working | 0:00:05 |
| 06.22.2009 12:28:18 | Inbox - Microsoft Outlook | Working | 0:00:05 |
| 06.22.2009 12:28:23 | Inbox - Microsoft Outlook | Working | 0:00:05 |
| 06.22.2009 12:28:28 | Inbox - Microsoft Outlook | Idle | 0:00:05 |

FIG 3

| 401 | 403 | 405 |
|---|---|---|
| Microsoft Excel | Idle | 0:03:30 — 407 |
| | Working | 0:01:54 — 409 |
| Microsoft Excel Total | | 0:05:24 — 411 |
| Microsoft Excel - Book1 | Idle | 0:01:20 |
| | Working | 0:00:20 |
| Microsoft Excel - Book1 Total | | 0:01:40 |
| Microsoft Excel - Book2 | Working | 0:00:10 |
| Microsoft Excel - Book2 Total | | 0:00:10 |
| Microsoft Excel - Book3 | Idle | 0:00:51 |
| | Working | 0:03:13 |
| Microsoft Excel - Book3 Total | | 0:04:04 |
| Microsoft Excel - CUTE V1.xls | Idle | 0:12:30 |
| | Working | 2:29:44 |
| Microsoft Excel - CUTE V1.xls Total | | 2:42:14 |
| Microsoft Excel - CUTE V2.xls | Idle | 0:07:10 |
| | Working | 0:00:58 |
| Microsoft Excel - CUTE V2.xls Total | | 0:08:08 |
| Microsoft Office Outlook | Idle | 0:00:05 |
| Microsoft Office Outlook Total | | 0:00:05 |
| Microsoft Office PowerPoint | Idle | 0:00:05 |
| | Working | 0:00:05 |
| Microsoft Office PowerPoint Total | | 0:00:10 |
| Microsoft Office Word | Idle | 0:00:05 |
| | Working | 0:00:05 |
| Microsoft Office Word Total | | 0:00:10 |

FIG 4

| Date & Time | Window (Idle/Working) | |
|---|---|---|
| 11/30/2010 | 17:53:45 Working - Microsoft Excel - Customer_Example_spreadsheet.xls | 00:00:05 |
| 11/30/2010 | 17:53:50 Working - Enterprise Sign On - Microsoft Internet Explorer | 00:00:05 |
| 11/30/2010 | 17:53:55 Working - Connect to ts1.company.com | 00:00:45 |
| 11/30/2010 | 17:54:40 Working - Enterprise Sign On - Microsoft Internet Explorer | 00:00:05 |
| 11/30/2010 | 17:54:45 Working - Attendance Time In - Microsoft Internet Explorer | 00:00:05 |
| 11/30/2010 | 17:54:50 Working - Attendance Time In - New Item - Microsoft Internet Explorer | 00:00:15 |
| 11/30/2010 | 17:55:05 Working - Attendance Time In - Microsoft Internet Explorer | 00:00:05 |
| 11/30/2010 | 17:55:10 Working - Media Application Portal - Microsoft Internet Explorer | 00:00:15 |
| 11/30/2010 | 17:55:25 Working - Presentation Server - Microsoft Internet Explorer | 00:00:05 |
| 11/30/2010 | 17:55:30 Idle - Remote Application Runtime | 00:00:05 |
| 11/30/2010 | 17:55:35 Idle - Media Desktop SAPI | 00:00:10 |
| 11/30/2010 | 17:55:40 Idle - Remote Application Runtime | 00:00:05 |
| 11/30/2010 | 17:55:50 Idle - Media Desktop SAPI - online plug-in | 00:00:05 |
| 11/30/2010 | 17:55:55 Working - Media Desktop SAPI | 00:00:05 |
| 11/30/2010 | 17:56:00 Idle - Media Desktop SAPI - online plug-in | 00:00:05 |
| 11/30/2010 | 17:56:05 Working - U:\Team\CUTT Tool | 00:00:05 |
| 11/30/2010 | 17:56:10 Working - U:\Team\Weekly Trackers | 00:00:05 |
| 11/30/2010 | 17:56:15 Working - U:\Team\Weekly Trackers | 00:00:05 |
| 11/30/2010 | 17:56:20 Idle - U:\Team\Weekly Trackers | 00:00:05 |
| 11/30/2010 | 17:56:25 Idle - Media Desktop SAPI ERROR | 00:00:05 |
| 11/30/2010 | 17:56:30 Working - Media Desktop SAPI - online plug-in | 00:00:05 |
| 11/30/2010 | 17:56:35 Idle - Media Desktop SAPI - online plug-in | 00:00:45 |
| 11/30/2010 | 17:57:20 Working - Media Desktop SAPI - online plug-in | 00:00:05 |
| 11/30/2010 | 17:57:25 Idle - Media Desktop SAPI - online plug-in | 00:00:05 |
| 11/30/2010 | 17:57:30 Working - Presentation Server - Microsoft Internet Explorer | 00:00:45 |
| 11/30/2010 | 17:58:15 Working - Microsoft Exchange - Outlook Web Access - Microsoft Internet Explorer | 00:00:05 |
| 11/30/2010 | 17:58:20 Working - Customer - Outlook Web Access - Microsoft Internet Access | 00:00:10 |
| 11/30/2010 | 17:58:30 Working - https://email.company.com - Maxicare Update: Company Dedicated Hotline | 00:00:05 |
| 11/30/2010 | 17:58:35 Idle - https://email.company.com - Maxicare Update: Company Dedicated Hotline | 00:00:45 |
| 11/30/2010 | 17:59:20 Working - Media Desktop SAPI - online plug-in | 00:00:38 |

FIG 5

Report

| Work Type | Time |
|---|---|
| *Idle* | 3:02:03 |
| *Working* | 7:35:30 |
| NPH | 0:38:50 |
| PH | 9:58:43 |
| Total | 10:37:33 |
| Window | Time |
| *Microsoft Internet Explorer* | 0:37:38 ~601 |
| *Idle*Microsoft Internet Explorer* | 0:17:46 ~603 |
| *Microsoft Excel* | 0:09:35 |
| *Idle*Microsoft Excel* | 0:04:41 |
| *Inbox - Microsoft Outlook* | 0:00:00 |
| *Idle*Inbox - Microsoft Outlook* | 0:00:00 |
| *Message* | 0:02:48 |
| *Idle*Message* | 0:00:52 |
| *PowerPoint* | 0:00:00 |
| *Idle*PowerPoint* | 0:00:00 |
| Other | 9:08:42 |
| Idle Other | 1:59:54 |

FIG 6

| Work Type | Report Time |
|---|---|
| *Idle* | =SUMIF($B$3:$C$2859,D3,$C$3:$C$2859)+SUMIF($B$3:$C$2859,"Working - ",$C$3:$C$2859) |
| *Working* | =SUMIF($B$3:$C$2859,D4,$C$3:$C$2859)-SUMIF($B$3:$C$2859,"Working - ",$C$3:$C$2859) |
| NPH | =SUMIF($B$3:$C$2859,"* - ",$C$3:$C$2859) |
| PH | =(E3-E5)+E4 |
| Total | =SUM(E5:E6) |
| Window | Time |
| *Microsoft Internet Explorer* | =SUMIF($B$3:$B$267,D9,$C$3:$C$267) |
| *Idle*Microsoft Internet Explorer* | =SUMIF($B$3:$B$267,D10,$C$3:$C$267) |
| *Microsoft Excel* | =SUMIF($B$3:$B$267,D11,$C$3:$C$267) |
| *Idle*Microsoft Excel* | =SUMIF($B$3:$B$267,D12,$C$3:$C$267) |
| *Inbox - Microsoft Outlook* | =SUMIF($B$3:$B$267,D13,$C$3:$C$267) |
| *Idle*Inbox - Microsoft Outlook* | =SUMIF($B$3:$B$267,D14,$C$3:$C$267) |
| *Message* | =SUMIF($B$3:$B$267,D15,$C$3:$C$267) |
| *Idle*Message* | =SUMIF($B$3:$B$267,D16,$C$3:$C$267) |
| *PowerPoint* | =SUMIF($B$3:$B$267,D17,$C$3:$C$267) |
| *Idle*PowerPoint* | =SUMIF($B$3:$B$267,D18,$C$3:$C$267) |
| Other | =E6-SUM(E17,E15,E13,E11,E9) |
| Idle Other | =E3-SUM(E10,E12,E14,E16,E18,E5) |

FIG 7

CU July Wk 4 FY'10 (Based on 9hr shift time)

Total Production Hours

| Date | Client 1 | Client 2 | Client 3 | Client 4 | Client 5 | Client 6 | Client 7 | Client 8 | Client 9 | Client 10 |
|---|---|---|---|---|---|---|---|---|---|---|
| 7/19/2010 | 5203 | 4640 | 4483 | 6904 | 17869 | 2339 | 4107 | 2726 | 3697 | 2916 |
| 7/20/2010 | 4258 | 4903 | 4078 | 6971 | 16740 | 2536 | 4253 | 2863 | 3127 | 2554 |
| 7/21/2010 | 5319 | 5260 | 4371 | 6354 | 16176 | 0 | 3805 | 2221 | 2721 | 2241 |
| 7/22/2010 | 4996 | 3711 | 4466 | 6708 | 16629 | 2111 | 4562 | 2838 | 2769 | 0 |
| 7/23/2010 | 4636 | 4573 | 3997 | 6332 | 15861 | 1919 | 3450 | 2103 | 2859 | 2385 |

Team Available Time and CU%

| Team Available Time | Client 1 | Client 2 | Client 3 | Client 4 | Client 5 | Client 6 | Client 7 | Client 8 | Client 9 | Client 10 |
|---|---|---|---|---|---|---|---|---|---|---|
| | 8640 | 6480 | 5940 | 9180 | 22140 | 3240 | 6480 | 4860 | 4320 | 3780 |
| 7/19/2010 | 60% | 72% | 75% | 75% | 81% | 72% | 63% | 56% | 86% | 77% |
| 7/20/2010 | 49% | 76% | 69% | 76% | 76% | 78% | 66% | 59% | 72% | 68% |
| 7/21/2010 | 62% | 81% | 74% | 69% | 73% | No data | 59% | 46% | 63% | 59% |
| 7/22/2010 | 58% | 57% | 75% | 73% | 75% | 65% | 70% | 58% | 64% | No data |
| 7/23/2010 | 54% | 71% | 67% | 69% | 72% | 59% | 53% | 43% | 66% | 63% |

MONITORING AND TRACKING APPLICATION USAGE

BACKGROUND

Using software tools currently available, it is often very difficult to monitor and track application usage in a standard and automated way. Furthermore, computer network and application security requirements may constrain the development of a tool that enables application utilization to be efficiently tracked.

Monitoring and tracking of application usage may be particularly desirable due to globalization. Globalization and the proliferation of information technology enable tasks that were once performed locally within an organization to be performed in other locations and possibly by other organizations. It is often desirable for an organization to have tasks performed in an area where labor is more cost-effective and/or to take advantage of the expertise and/or specialization of another organization. It may also be useful for an organization to focus on its core business and outsource tasks unrelated to its core business to other organizations.

Outsourcing, particularly Business Process Outsourcing (BPO), may be understood to describe a situation where a client organization imposes a specific set of tasks upon a third party or entity. The third party or entity may be a separate or an auxiliary organization. The third party may be located in another country or in a location near the client organization. One example of Business Process Outsourcing is a third party organization providing information technology (IT) services for an automobile and/or a machine tools manufacturer. These IT services might range from supply chain management to the control of manufacturing processes. Some of these IT services might be performed in one country whereas other IT services may be performed in a different country.

An outsourcing environment, particularly a BPO environment, may be understood to include objects, processes and circumstances defining how the third party performs tasks for the client organization. The elaboration of a BPO environment may include information system configuration requirements, access control requirements or restrictions imposed for the sake of security. The objects in the BPO environment may include equipment, such as computers with a specific software and/or hardware configuration. It may be desirable for a client organization to partially define a BPO environment for the third party in order to mitigate risk and maintain accountability within the client organization. Thus, the third party may be required to operate under restrictions outside its control.

One or more technical restrictions may be imposed on users, user computers and/or server computers in an outsourcing environment. It may be desirable to constrain the communications of computers in an outsourcing environment to one Local Area Network (LAN), or to limit the communications of a computer in an outsourcing environment to an explicitly identified set of computers. Network connectivity in an outsourcing environment may be limited to users and computers directed to perform a specific set of tasks. It may also be desirable to restrict user access to computers and/or to restrict the interactions allowed between computers.

Prior art solutions for monitoring and tracking application usage may be tailored to specific applications and processes. In other words, each application may require a separate monitoring and tracking solution integrated into the source code of the application. Also, prior art solutions may capture transactional data of monitored applications. Accordingly, a prior art solution may be a front-end for a suite of applications or for each application. The front-end may interface with the code of the application in order to determine how the application is being used. Thus, prior art solutions may require a separate monitoring and tracking tool to be written for each application, may also require access to the source code of the application, and may interact with the application programming interface (API) of each application. In other words, prior art solutions may require a dedicated tracking tool for each application. Such solutions may necessitate extensive program development efforts and may violate security standards by requiring access to application source code; thus, it is often impossible to technically implement the monitoring and tracking solution.

SUMMARY OF THE DESCRIPTION

According to an aspect, a computer-implemented method of monitoring and tracking application usage is provided. The method comprises obtaining, during a first interval, a first identifier of an active window in a first graphical user interface (GUI). In addition, the method comprises determining, during the first interval, a first indication of whether a first user has provided a first input, as well as storing the first identifier and the first indication.

According to another aspect, a computer-implemented method of monitoring and tracking application usage is provided. The method comprises determining, during a first interval, a first indication of whether a first user has provided a first input. The method further comprises obtaining, during the first interval, a first identifier of an active window in a first graphical user interface (GUI). The method further comprises selectively storing the first identifier and the first indication.

In a first embodiment, selectively storing comprises when the first identifier is different from a most recently stored identifier, or when the first indication is different from a most recently stored indication, or when there is no previously stored identifier and no previously stored indication: storing the first identifier and the first indication. The most recently stored identifier may be understood as a previously stored identifier where there is no identifier stored after the most recently stored identifier and before the first identifier. The most recently stored indication may be understood similarly.

In a second embodiment, selectively storing comprises when the first identifier is different from a most recently stored identifier, or when there is no previously stored identifier: storing the first identifier and the first indication.

The method may be implemented to track the usage of a single application or a plurality of applications. An interval may be understood as a specified (predetermined or predeterminable) period of time. The interval may be about 5 seconds, 10 seconds or 15 seconds. In some cases 10 minute or 15 minute intervals may be suitable. Other intervals may also be suitable depending on the applications, and/or how the applications are being used.

Monitoring and tracking application usage may include determining if a particular application is being used, or determining whether an unauthorized application is being used, or no application is being used. In addition, monitoring and tracking of application usage may involve summarizing application usage so that the summary can be easily read and understood. Monitoring and tracking of application usage may be implemented using a tracking tool.

In some embodiments, selectively storing the first identifier and the first indication includes saving the first identifier and the first indication in a first data set, such as in a first data sheet. Accordingly, the method may further comprise obtaining, during a second interval, a second identifier of an active window in a second GUI. In particular, the second GUI may be different from the first GUI. In addition, the method may comprise determining, during a second interval, a second indication of whether a second user has provided a second input. The method may also comprise saving the second identifier and the second indication in a second data set, such as in a second data sheet. Moreover, the method may comprise copying data of the first data set (particularly first data sheet) and data of the second data set (particularly second data sheet) into a third data set such as into a third data sheet.

In some cases, copying data of the first data sheet and data of the second data sheet into the third data sheet includes copying all of the data of the first data sheet and all of the data of the second data sheet into the third data sheet.

A data sheet may also be understood as a worksheet. In other words, a data sheet may be an array of cells displayed by a spreadsheet program, where each cell can be thought of as a box for holding a data element. Thus, a spreadsheet, worksheet or data sheet may be understood as an electronic representation of multiple cells or fields that together make up a grid consisting of rows and columns. A spreadsheet may be displayed inside an application program, such as Microsoft Excel (Excel is a trademark of Microsoft Corporation).

The first GUI may be the GUI of a first computer and the second GUI may be the GUI of a second computer that is different from the first computer.

Furthermore, the first data sheet, the second data sheet, and the third data sheet may be located in a shared folder of a third computer that is different from the first and the second computer. Also, the shared folder may be accessible from the first GUI and the second GUI.

In some cases, the first data sheet, the second data sheet or both data sheets may be transmitted to a central location, e.g. via email or some other suitable network protocol. Optionally, the transmitted data sheets may be processed using a rule or macro. The rule may consolidate information from the data sheets in order to generate a report, e.g. a summary report. This may have the effect of making it easier for a user to process the data sheets.

Accordingly, it may be that the first computer and the second computer are user computers. Particularly, in the BPO environment, it may be that each user computer only accepts network communications received as a response to a request originating from the user computer and the user computer does not accept network communications which originate from another computer. For example, this may be understood to mean that the user computer will accept Transmission Control Protocol (TCP) or User Datagram Protocol (UDP) packets from another computer only if those packets are determined to be a response to TCP or UDP packets sent by the user computer.

In addition, it may be the case that the third computer is a server computer. In this case, the shared folder may be stored on the server computer. Moreover, the shared folder may contain the first, second and/or third data sheets, and the shared folder may be accessible by the user computer. In the outsourcing environment, the server computer may accept communications which originate from other computers.

In some embodiments, the first data sheet is located on a first computer, the second data sheet is located on a second computer and the third data sheet is located on a third computer. Accordingly, copying the data of the first data sheet and the data of the second data sheet into the third data sheet further comprises opening a connection from the first computer to the third computer and copying the first data sheet to the third computer, as well as opening another connection from the second computer to the third computer and copying the second data sheet to the third computer.

It may be that the first interval and the second interval overlap. In other words, the time period covered by the first interval may coincide, to some extent or entirely, with the time period covered by the second interval.

Selectively storing the first identifier and the first indication may include saving the first identifier and the first indication in a first data set, such as a first data sheet. Accordingly, the method may also comprise determining, during the second interval, a second indication of whether the first user has provided a second input. The method may further comprise obtaining, during a second interval, a second identifier of an active window in the GUI. The method may also comprise storing the second identifier and the second indication, when the second identifier is different from the first identifier, or when the second indication is different from the first indication. The combination of an identifier and an indication may be referred to as an input status. Accordingly, this embodiment may have the effect of reducing storage requirements, since a second input status is only stored when the second input status differs from the most recent input status (in this case, the first input status.

The method may further comprise transmitting the first data sheet to a second computer, processing the first data sheet using a macro, and consolidating information from the first data sheet with information from one or more further data sheets in order to generate a report. Processing may also be performed using a rule or similar programming tool.

Furthermore, protection may be implemented for the first data sheet and/or the second data sheet. This protection may achieve the result that the data of the first data sheet and the data of the second data sheet are protected from access by unauthorized users. Thus, the protection may prevent the user of the first computer from accessing the data of the first data sheet.

Determining the first indication may comprise verifying whether the first user has provided the first input using a keyboard and/or a navigation device or any input device e.g. a pointing device such as a mouse. Similarly determining the second indication may comprise verifying whether the second user has provided the second input using a keyboard and/or a pointing device such as a mouse.

In some embodiments, the first identifier and the first indication may not display in the first GUI. Accordingly, the tracking tool may run in the background, and the execution of the tracking tool may be transparent to the user.

Also, it may be that interfaces of the application are not accessed. In other words, monitoring and tracking of application usage may be performed without accessing the APIs of any of the applications being monitored and tracked. Thus, the tracking tool does not function as a front-end of any of the applications. Accordingly, monitoring and tracking of application can be performed through a variety of delocalized computers, particularly in a situation where technical restrictions are imposed on users, user computers and/or server computers in an outsourcing environment.

In addition, the first identifier of the active window in the first GUI may identify a different application than the second identifier of the active window in the second GUI. Thus, different applications may be monitored and tracked using the tracking tool. The tracking tool may be operable to monitor and track new or further applications without any additional development effort. For example, the first computer may be running Microsoft Word, and the second computer may be running Microsoft Excel. One or more of the used terms might be trademarks of their respective owners.

In some embodiments, the method steps may be implemented by means of macros. In other words, the method steps may be implemented using units of Visual Basic for Applications code.

According to yet another aspect, a computer program product, particularly, tangibly embodied on a computer-readable medium, embodied as a signal and/or as a data stream, is provided. The computer program product comprises computer-readable instructions, which, when loaded and executed on a computer system, cause the computer system to perform operations according to the above computer-implemented method of monitoring and tracking application usage.

According to a further aspect, a computer system for monitoring and tracking application usage is provided. The system may comprise a first computer including a first graphical user interface (GUI) configured to display a first active window, a first timer configured to define a first interval, and a first input device. The first computer is operable to determine, during the first interval, a first indication of whether a first user has provided a first input to the first input device. The first computer is further operable to obtain, during the first interval, a first identifier of the first active window, and selectively store the first identifier and the first indication.

According to yet a further aspect, a computer system for monitoring and tracking application usage is provided. The system may comprise a first computer including a first graphical user interface (GUI) configured to display a first active window. Accordingly, the first computer includes a first timer configured to define a first interval, and a first input device. The first computer is operable to obtain, during the first interval, a first identifier of the first active window. The first computer is further operable to determine, during the first interval, a first indication of whether a first user has provided a first input to the first input device, and to store the first identifier and the first indication.

In some embodiments, the computer system further comprises a second computer; in particular, the second computer may be different from the first computer. Accordingly, the second computer includes a second graphical user interface (GUI) configured to display a second active window. The second computer includes a second timer configured to define a second interval, and a second input device. The computer system also includes a third computer. Furthermore, the second computer is operable to obtain, during the second interval, a second identifier of the second active window. The second computer is further operable to determine, during the second interval, a second indication of whether a second user has provided a second input to the second input device, and store the second identifier and the second indication. Accordingly, the first computer is further operable to store the first identifier and the first indication by saving the first identifier and the first indication in a first data sheet. In addition, the second computer is further operable to store the second identifier and the second indication by saving the second identifier and the second indication in a second data sheet. Also, the third computer is operable to copy data of the first data sheet and data of the second data sheet into a third data sheet.

Moreover, it may be the case that installing and executing computer programs must be performed without administrator access in the BPO environment. This may be understood to mean that installing and executing the tracking tool does not require administrator access to the user computer and/or the server computer (i.e. the first computer, the second computer, and/or the third computer).

In addition, it may be that, in the BPO environment, a computer program, e.g. the tracking tool, may only be installed on the user computer if the installation of the computer program works without changes to the registry of the user computer.

These and other aspects may have a number of advantages. One advantage may be that the tracking tool requires minimal installation. Put another way, the tracking tool is easy to install. In the context of a Microsoft Windows environment, installation of the tracking tool does not require registry changes or administrator access to the user computer (Windows is a trademark of Microsoft Corporation). In addition, the tracking tool does not require a dedicated server.

A further advantage may be that the tracking tool can operate under technical restrictions and/or requirements, particularly applying to an outsourcing environment. For example, in some embodiments the tracking tool does not require open TCP/IP ports on user computers (e.g. the first computer or the second computer) in order to enable monitoring and tracking of application usage. Opening a TCP/IP port on a computer may be understood as allowing an external application (i.e. an application on another computer) to initiate communication to the computer.

An additional advantage of the tracking tool may be that the tracking tool works without access to the Internet in order to function. Thus, the integrity of an organization's network perimeter may be preserved and/or a high level of security may be achieved.

Administrator access may be understood as superuser or privileged access to a computer system. In the context of a specific operating system, administrator access may be understood as access to the Administrator account in a Microsoft Windows environment, as membership of the Administrators group in a Microsoft Windows environment or as access to the root account in a Unix environment. In this document, Microsoft Windows is used to refer to a recent version of Microsoft's Windows operating system, such as Microsoft Windows XP, Microsoft Windows Vista, or Microsoft Windows 7.

A registry or a computer's registry may be understood as a central database containing information for booting, configuring and/or tailoring a computer system. A registry may be associated with recent versions of Microsoft's Windows operating system.

The subject matter described in this specification can be implemented as a method or as a device, possibly in the form of one or more computer program products. The subject matter described in the specification can be implemented in a machine readable medium, where the medium is embodied in one or more information carriers, such as a CD-ROM, a DVD-ROM, a data signal, a semiconductor memory, or a hard disk. Such computer program products may cause a data processing apparatus to perform one or more operations described in the specification.

In addition, subject matter described in the specification can also be implemented as a system including a processor, and a memory coupled to the processor. The memory may encode one or more programs to cause the processor to perform one or more of the methods described in the specification. Further subject matter described in the specification can be implemented using various machines.

Moreover, the subject matter described in this specification may be implemented using a variety of programming languages and tools including Visual Basic for Applications (VBA) or Visual Basic.

Details of one or more implementations are set forth in the accompanying exemplary description and drawings below. Other features will be apparent from the description and drawings, as well as from the claims.

BRIEF DESCRIPTION OF DRAWINGS

FIG. 3 depicts an exemplary data sheet showing raw data output of the tracking tool.

FIG. 5 shows another exemplary data sheet, showing raw data output of the tracking tool.

DETAILED DESCRIPTION AND PREFERRED EMBODIMENTS

In the following text, a detailed description of examples will be given with reference to the drawings. It should be understood that various modifications to the examples may be made. In particular, elements of one example may be combined and used in other examples to form new examples.

Figure 1:
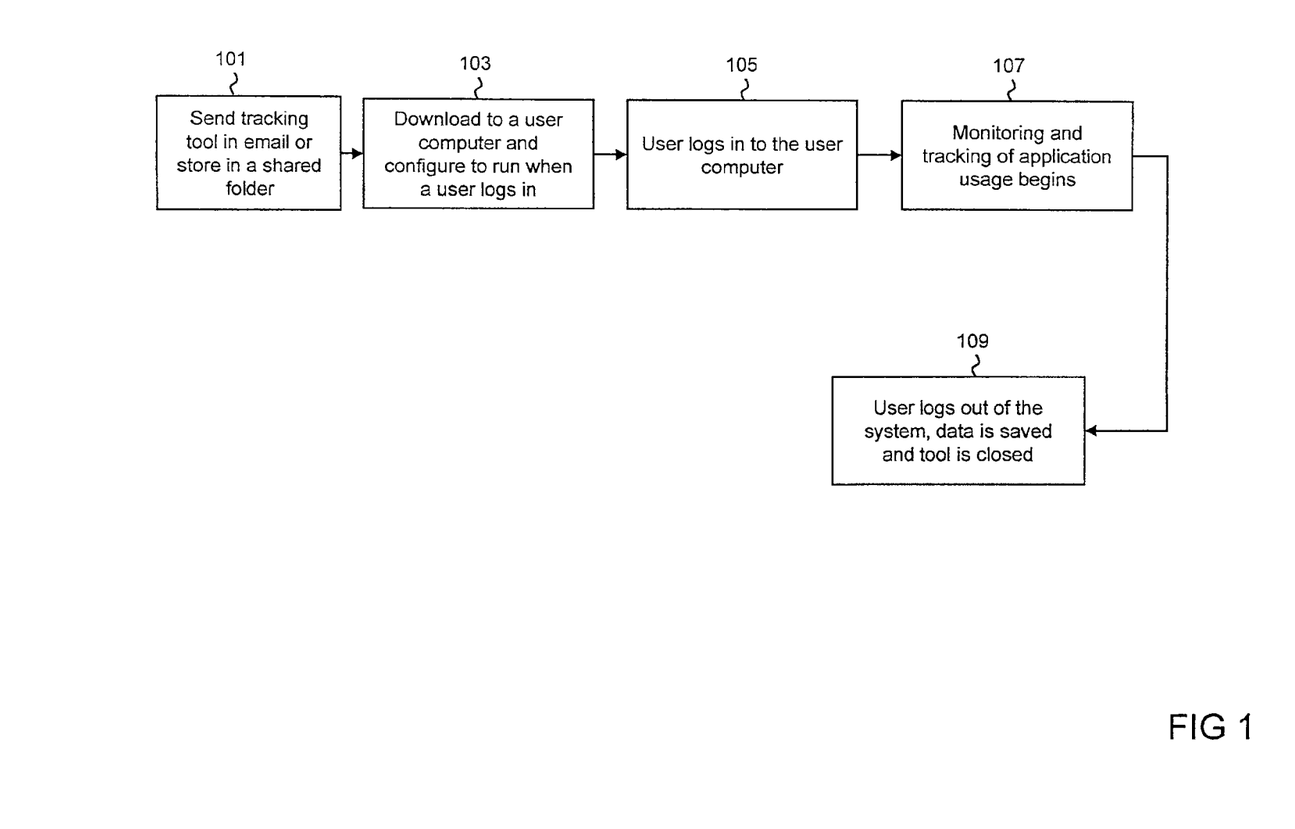
FIG. 1 shows a flow diagram of how to install and use a tracking tool.

FIG. 1 shows a flow diagram of steps performed in order to install and use a tool for monitoring and tracking application usage, also referred to as a tracking tool. The tracking tool may be understood as a computer program that records or stores data describing the use of other computer programs on a computer system. For example, the tracking tool may record information regarding how long a computer program or application is used, and/or whether input to the computer system is provided. In some embodiments, the tracking tool may record information describing the usage of applications on a personal computer operated by a user.

At step 101, the tracking tool may be an attachment to an email sent to a user or stored in a shared folder. Items or files in the shared folder may be shared using a file sharing protocol supported in a Microsoft Windows environment (e.g. Common Internet File System and/or Server Message Block). Other file sharing protocols and other operating systems are also possible. At step 103, the tracking tool may be downloaded or provided to a user computer and configured to run or start running when a user logs in. For example, on a Microsoft Windows computer, a shortcut to the location of the tracking tool on the file system may be added to the Windows Startup folder.

A user may log in to the user computer at step 105. At step 107, according to the example of FIG. 1, monitoring and tracking of application usage begins. When a user logs out at 109, the tracking tool automatically saves tracked data, and the tracking tool is closed.

Advantageously, the tracking tool may execute in the background and access to tracked data may be limited. Furthermore, execution of the tracking tool may be transparent to the user. Alternatively, only a plain worksheet of a spreadsheet application may be visible to the user. In one example, transparency may be advantageous since the user could become uncomfortable if he is aware that application usage on the user computer is being monitored and tracked. Steps 101 to 109 may be repeated for multiple computers.

Figure 2:
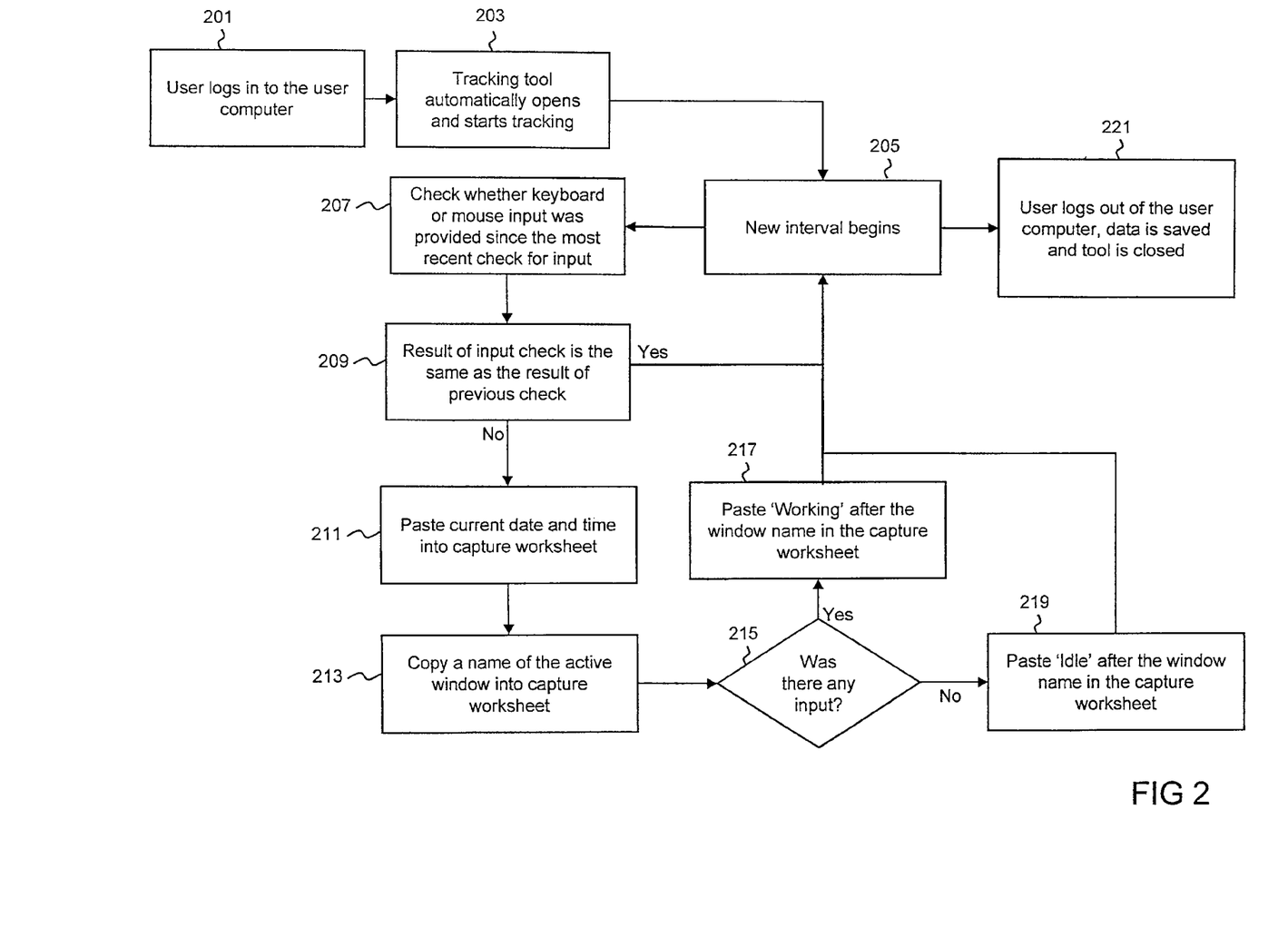
FIG. 2 shows a flow diagram depicting steps that may be performed from when the tracking tool is first activated to when the tool is shut down.

FIG. 2 shows a flow diagram depicting steps that may be performed from when the tracking tool is first activated to when the tool is shut down. At step 201, the user logs in to the user computer. The user computer may also be referred to as a first computer and/or a second computer. After the user logs in, the tracking tool may automatically open and start tracking at step 203.

After step 203, steps 205 to 219 may be repeated until step 221 is performed. The repetition of steps 205 to 219 may result in storing data that tracks work performed on the user computer. The stored data may also be used to do scientific time and motion studies for any process performed on the user computer. Moreover, the stored data may be used to monitor the flow of activity based on the flow of windows used by the user in order to perform statistical analysis and achieve process improvements. Furthermore, the stored data may make it possible to monitor the quality of the process by viewing the flow of the process through the windows opened by the user. The stored data may also be used to indirectly track the processer utilization of the user computer(s) based on the extent of user input.

At step 205, a new interval (e.g. a first interval or a second interval) may begin. In this context, each interval may be understood as a specified (predetermined or predeterminable), finite period of time, e.g. 5 seconds. It may be an advantage that the interval can be varied according to the applications being monitored and/or the process being performed. Thus, in some cases, a 5 second interval may be appropriate, whereas in other cases an interval of about 10 minutes may be suitable. Other intervals are also possible.

In some implementations, the interval is determined via interaction with a system timer of the user computer. Use of the system timer may have the advantage of increasing the difficulty of creating false input, i.e. creating a second program that makes it appear that a particular application is being actively used. This is because the second program might also require repeated access to the system timer. Repeated access to the system timer could be detected and reacted to by the tracking tool.

At step 207, the tracking tool may determine an indication of whether the user has provided input. Step 207 may be implemented by checking whether any input has been provided by the user by means of a keyboard and/or navigation device, particularly whether a pointing device (such as mouse) and/or keyboard input has been provided since the most recent check for input. In other words, one or more functions may be called in order to determine whether a key (i.e. a keyboard key and/or a mouse button) was pressed since the most recent check for input. In a specific example, a function may be called for each key (e.g. as part of a loop) in order to determine whether the key was pressed since the last time the key was queried. Alternatively, the function may determine whether the key was pressed during a time period. The one or more functions may include Windows API functions such as GetAsyncKeyState( ).

Other external devices, such as a scanner, a network connection, a CD-ROM drive, and/or a disk drive may also (or alternatively) be checked for activity or to determine whether the user has interacted with (i.e. provided input to) the device. Providing input may be understood as giving information to a computer, e.g. by typing on a keyboard or inserting a CD. Thus, determining whether the user has provided input may involve determining whether the user has provided the input during a period of time. Consequently, an increase in the length of the interval may also increase the period of time checked for input.

Step 207 may be a quick and efficient way to determine an indication of whether the user has provided input.

At step 209, it is determined whether a result of the input check of step 207 is the same as a result of the most recent input check. If the result of the input check of step 207 is the same as the result of the most recent input check, step 205 is performed after step 209. If the result of the input check of step 207 is not the same as the result of the previous input check, then step 211 is performed after step 209. Performance of step 209 may have the effect that the quantity of data stored in the capture worksheet is reduced, particularly in comparison to the situation where a result of an input check is stored for each interval.

In the special case of the first interval, there is no previous input check, so step 211 may be performed after step 209. Alternatively, in the case of the first interval, step 209 may be skipped and step 211 may be performed after step 207.

According to the example depicted in FIG. 2, the current date and time are pasted into a capture worksheet at step 211. The capture worksheet may also be referred to as a worksheet or a data sheet.

In addition, a name of an active window may be pasted into the capture worksheet at 213. The name of the active window may also be referred to as the title or the identifier of the active window. The active window may also be referred to as the foreground window. The active window may be understood as the window with which the user is currently working e.g. by providing an input thereto such as by means of a keyboard and/or a pointing device. The name of the active window may be understood as the text of the window's title bar. Alternatively, if the active window is a control, the name of the active window may be the text of the control. In the context of Microsoft Windows, the name of the active window may be obtained by interacting with Windows Application Programming Interface (API) functions. More specifically, the name of the active window may be obtained using the Windows API functions GetForegroundWindow( ) and GetWindowText( ) Alternative mechanisms are also possible.

Step 213 may be a quick and efficient way to obtain the name of the current active window, e.g. by copying a name of the active window into the capture worksheet.

Also, one or more of steps 207 to 213 may be performed at least partly in parallel, which may further increase efficiency. Moreover, functionality may be provided so that other system functions can be performed while steps 207 to 213 are being carried out.

The indication may be evaluated at step 215. If input was provided, at step 217 the tracking tool may paste "WORKING" after the name of the active window in the capture worksheet. Some other suitable text may also be pasted in order to register that work was performed since the most recent check for input. If no input was provided, at step 219 the tracking tool may paste "IDLE" after the name of the active window in the capture worksheet. Some other suitable text may also be pasted in order to register that no work was performed since the most recent check for input.

Data stored (i.e. pasted or copied) in the capture worksheet may be protected using a worksheet lock. Stored data may include the identifier of the active window and the indication of whether the user provided input. Protecting stored data in the capture worksheet may involve locking cells, hiding cells and/or locking the capture worksheet. In the specific example of Microsoft Excel, protecting stored data may also include designating the capture worksheet as "hidden" or "very hidden".

After step 209, 217, or 219, depending on the circumstances, step 205 may be performed again at the beginning of a new interval. The pasting and copying operations described above may be performed automatically by the tracking tool.

At step 221 the user may log out of the user computer. According to the example, in step 221, data stored during steps 205 to 219 is automatically saved, e.g. to a data sheet, and the tracking tool is closed. Thus, it is possible that data is stored in RAM in steps 205 to 219 and written to a file in step 221. Alternatively, the data stored in steps 205 to 219 may be written to the file in the corresponding steps and the file may be closed in step 221.

In some embodiments, steps 201 to 221 are performed by multiple user computers, e.g. at least a first computer and a second computer. The first computer and the second computer may include at least a first GUI and a second GUI respectively. The files created in step 221 may be stored in a shared folder of a third computer different from the first and second computer. The shared folder accessible via file sharing protocols such as Server Message Block (SMB). The third computer may also be referred to as a server computer.

In a first example, at step 221, a macro may be executed in order to copy the data of the data sheet created by the first computer and copy the data of the data sheet created by the second computer into one data sheet created by the third computer. In the context of this specification a macro may be understood as a unit of computer code, or more specifically, a unit of VBA code. The data sheet created by the third computer may be analyzed and data comparisons may be performed.

Compiling the data of the data sheets from multiple user computers into one data sheet on the server computer may have the advantage of being inexpensive and easily implemented. In addition, compiling multiple spreadsheets into one spreadsheet may leverage existing user expertise, since many users are trained to use spreadsheets, whereas fewer users may be trained to use databases.

Alternatively, in a second example, each file created in step 221 may be stored on the corresponding user computer. Each stored file may be transmitted to a particular user, e.g. via email or another application protocol. The transmitted files can then be processed, possibly using rules or filters. More specifically, each capture worksheet may be received via email and stored in a particular folder using a rule. A macro may open each email in the folder and save the worksheets to the shared folder.

The method described in connection with FIG. 2 may also have the advantage that bandwidth will not be wasted, since only minimal necessary data is transmitted from the user computer(s) to the server computer. In other words, data traffic over the network can be reduced and/or optimized.

Implementing the method of FIG. 2 using macros may have the advantage of complying with security policies of some organizations, even in case these security policies do not allow the use of Visual Basic or other programming languages.

In addition, monitoring and tracking application usage with the tracking tool may be more reliable than manual methods.

FIG. 3 depicts an exemplary data sheet showing raw data output of the tracking tool. The data sheet may also be referred to as the capture worksheet or the worksheet.

According to the example depicted, a date column 301 may include the current date and time, e.g. as inserted in step 207. A window name column 303 may include the name of the active window, e.g. as inserted in step 209. Furthermore, an input column 305 (input column 305 may also be referred to as an input status column) may include an indication of whether user input was received since the most recent check for user input. According to the example, "Working" may appear in cells of the input column 305 where user input was received, and "Idle" may appear in cells of the input column 305 where user input was not received. Different indications may be highlighted or marked in different ways such as in different colors.

A time period column 307 may indicate the duration of the interval, i.e. the time period between a first execution of steps 205 to 217 and a second execution of steps 205 to 207.

Figure 4:
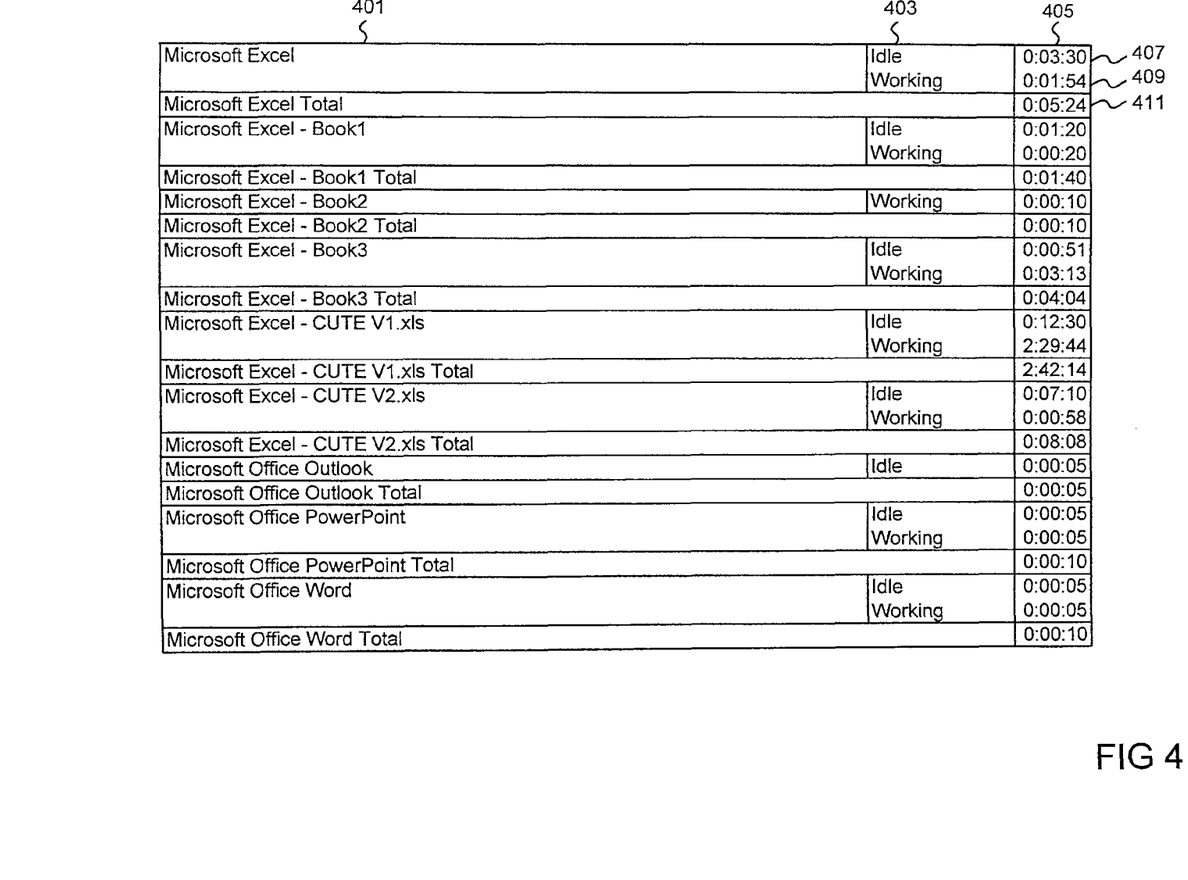
FIG. 4 depicts exemplary report data summarising raw data output of the tracking tool.

FIG. 4 depicts exemplary report data summarizing the data depicted in FIG. 3 and other raw data not shown.

A window title column 401 refers to an active window name from the window name column 303. The window title column 401 may also include rows to identify a total amount of time. An input register column 403 may include the text pasted into the capture worksheet in steps 215 and 217.

A total time column 405 may provide an idle time sum 407, a working time sum 409 and a total time entry 411. The idle time sum 407 may be a summation of the intervals during which input was not received when the window name listed in the window title column 401 was the active window. The working time sum 409 may be a summation of the intervals during which input was received when the window name listed in the window title column 401 was the active window. The total time entry 411 may be the sum of the idle time sum 407 and the working time sum 409.

For rows identifying the total amount of time, e.g. the row of the total time entry 411, the input register column 403 may be blank.

The summary depicted in FIG. 4 may be referred to as a pivot table. Other means of summarizing raw data stored according to the steps of FIG. 2 are also possible.

It may be an advantage that the tracking tool can be implemented using software available on many personal computers, such as Microsoft Windows and Microsoft Excel. This may result in reduced costs in comparison to other solutions. In addition, it may be possible to reduce user training time since reports of the tracking tool can be viewed using existing spreadsheet applications, such as Microsoft Excel.

The tracking tool may enable reporting and data gathering to be easily centralized and may also facilitate the use of standardized utilization metrics. Reports from the tracking tool may also be used to reduce operating costs and may lead to increased productivity, better forecasting and improved service delivery. Reports may also provide visibility into variations in process execution among different users and facilitate the sharing of best practices. Monitoring and tracking of application usage may also enhance the understanding of non-productive activities and provide better control with less ambiguity.

Similar to FIG. 3, FIG. 5 shows another exemplary data sheet, showing raw data output of the tracking tool. The output depicted in FIG. 5 is formatted in a different way in comparison to the output depicted in FIG. 3. In particular, FIG. 5 combines input (or input status), e.g. "working" or "idle", with a window name.

Figure 6:
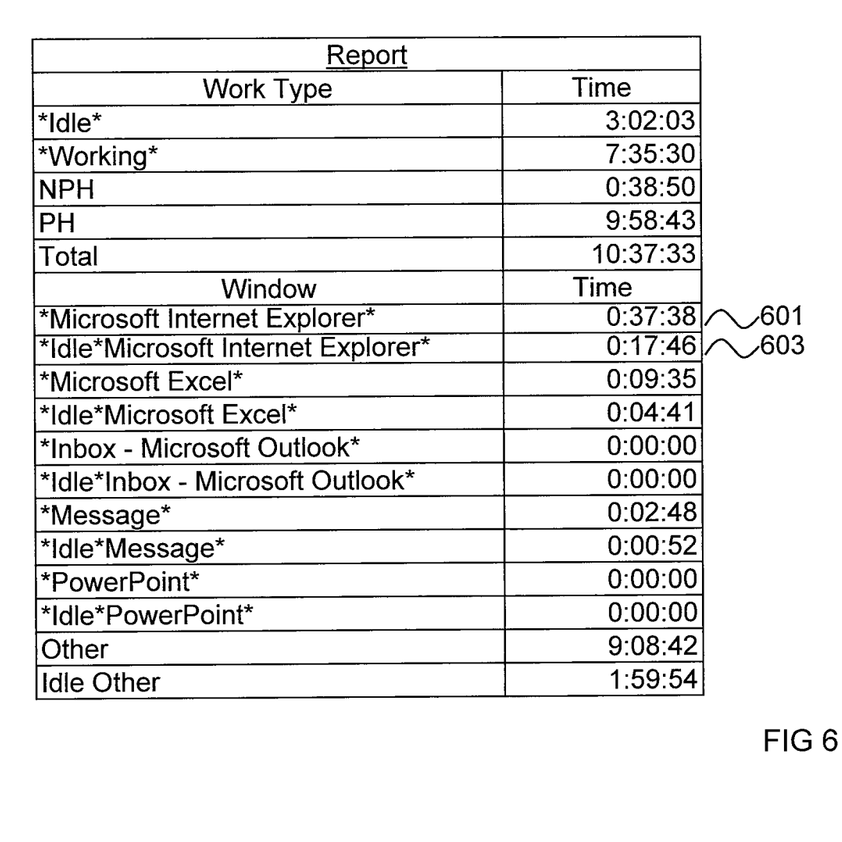
FIG. 6 shows a partial report on the output of FIG. 5.

FIG. 6 shows a report based on a particular output, where the particular output may include the output of FIG. 5. Report row 601 indicates that Microsoft Internet Explorer was the active window for 37 minutes and 38 seconds. Report row 603 indicates that Microsoft Internet Explorer was idle for 17 minutes and 46 seconds out of the 37 minutes and 38 seconds. Thus, even though Internet Explorer was the active window for over 37 minutes, no input was received for more than 17 minutes. The report of FIG. 6 shows similar information for other applications (e.g. Microsoft Excel and Microsoft Outlook). Particularly, working time and idle time can be reported separately for each active window.

Figure 7:
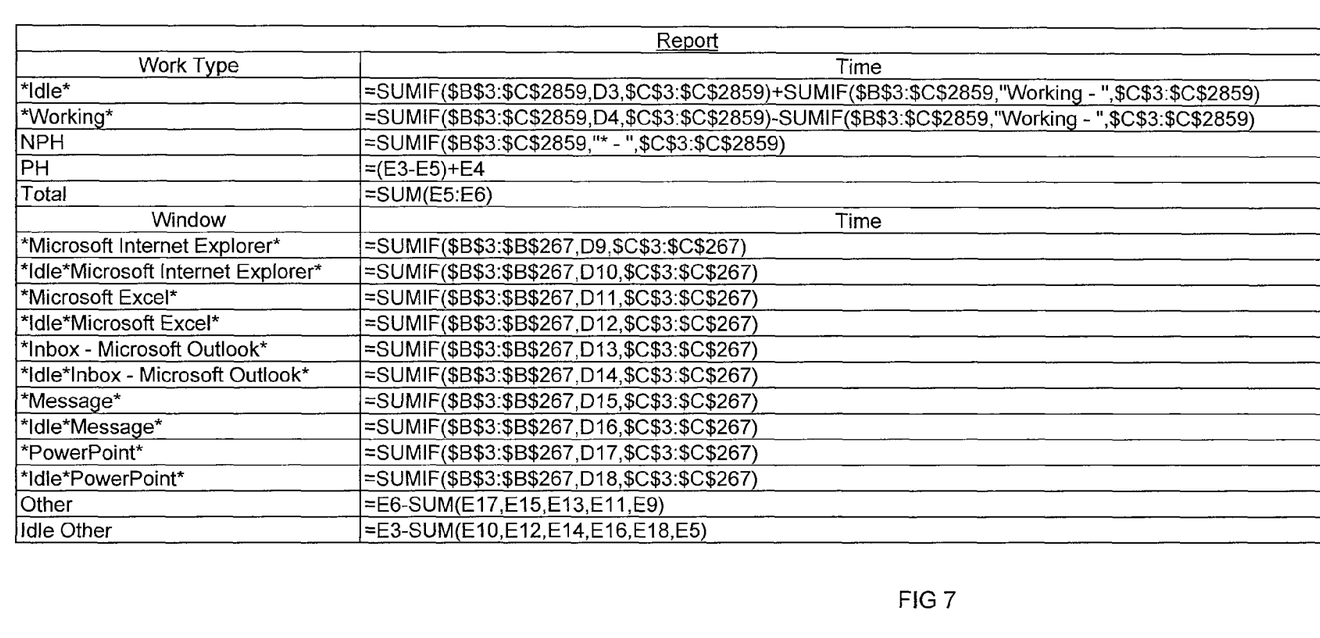
FIG. 7 shows formulas that can be used to generate reports.

FIG. 7 shows formulas that can be used to generate the report of FIG. 6. The formulas may be implemented using a spreadsheet application, such as Microsoft Excel. The steps associated with FIG. 7 may be performed in conjunction with or as part of step 221 of FIG. 2.

In some cases, the tracking tool will receive a signal to close user at the end of a working period, e.g. a day. Upon receipt of the signal, the tracking tool may use the formulas depicted in FIG. 7 to calculate the report of FIG. 6. The raw data and/or the report (i.e. tracking data) may be sent to a user, possible by means of email. After the tracking data has been sent, the raw data, e.g. as depicted in FIGS. 3 and 5, may be deleted.

According to the example, there are 50 users using the tracking tool. Each user may close the tracking tool, causing an email to be sent to a server. Each email may include tracking data corresponding to one of the 50 users. The emails may be stored in a folder on the server, and the tracking data may be saved to a central location, possibly the shared folder referred to in connection with FIG. 2.

Figure 8:
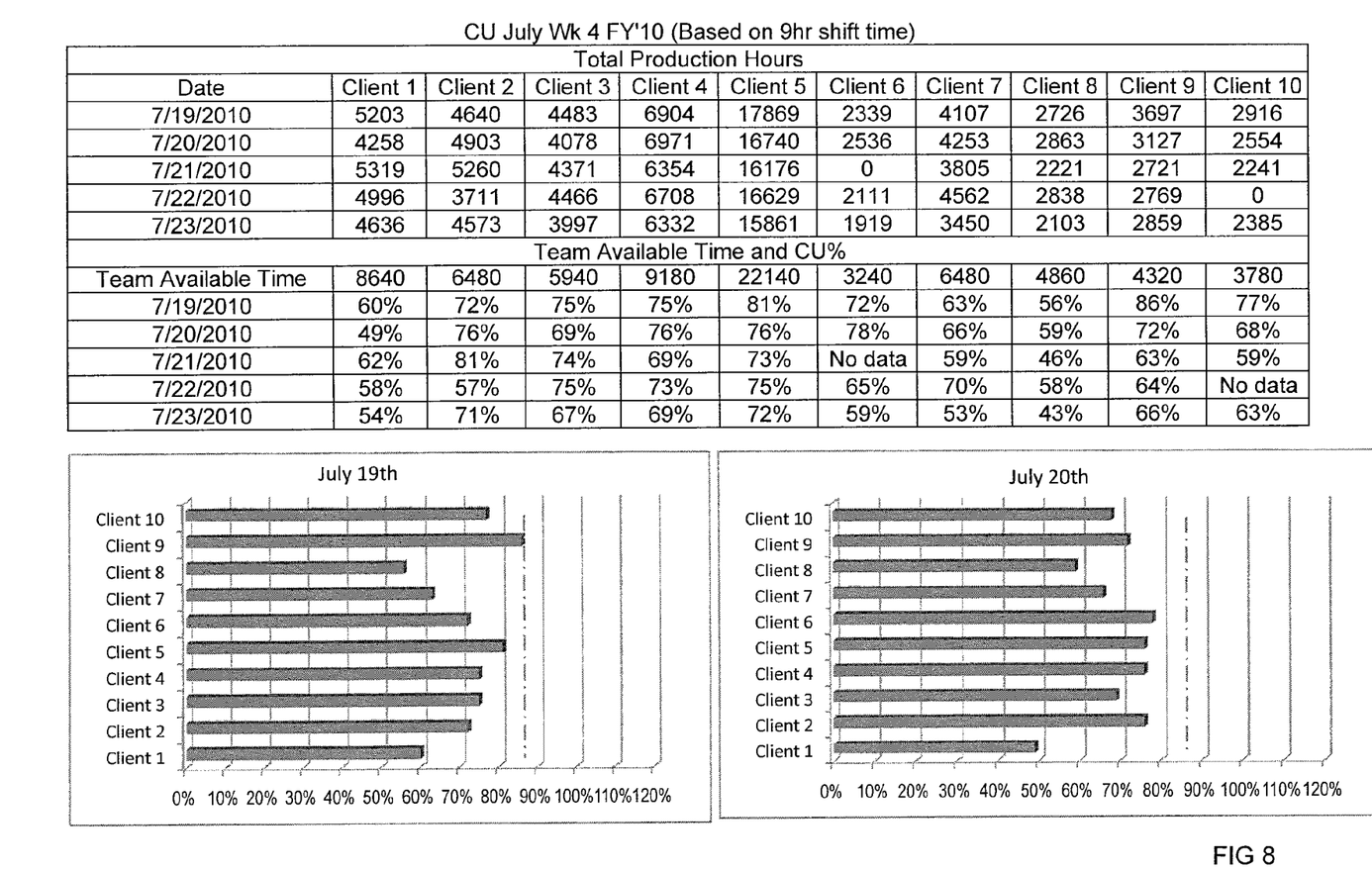
FIG. 8 shows a summary report that can be generated based on tracking data from multiple tracking tools.

FIG. 8 shows a summary report that can be generated based on the tracking data from multiple tracking tools. The summary report can be analyzed to determine a level of team efficiency and productivity.

Figure 9:
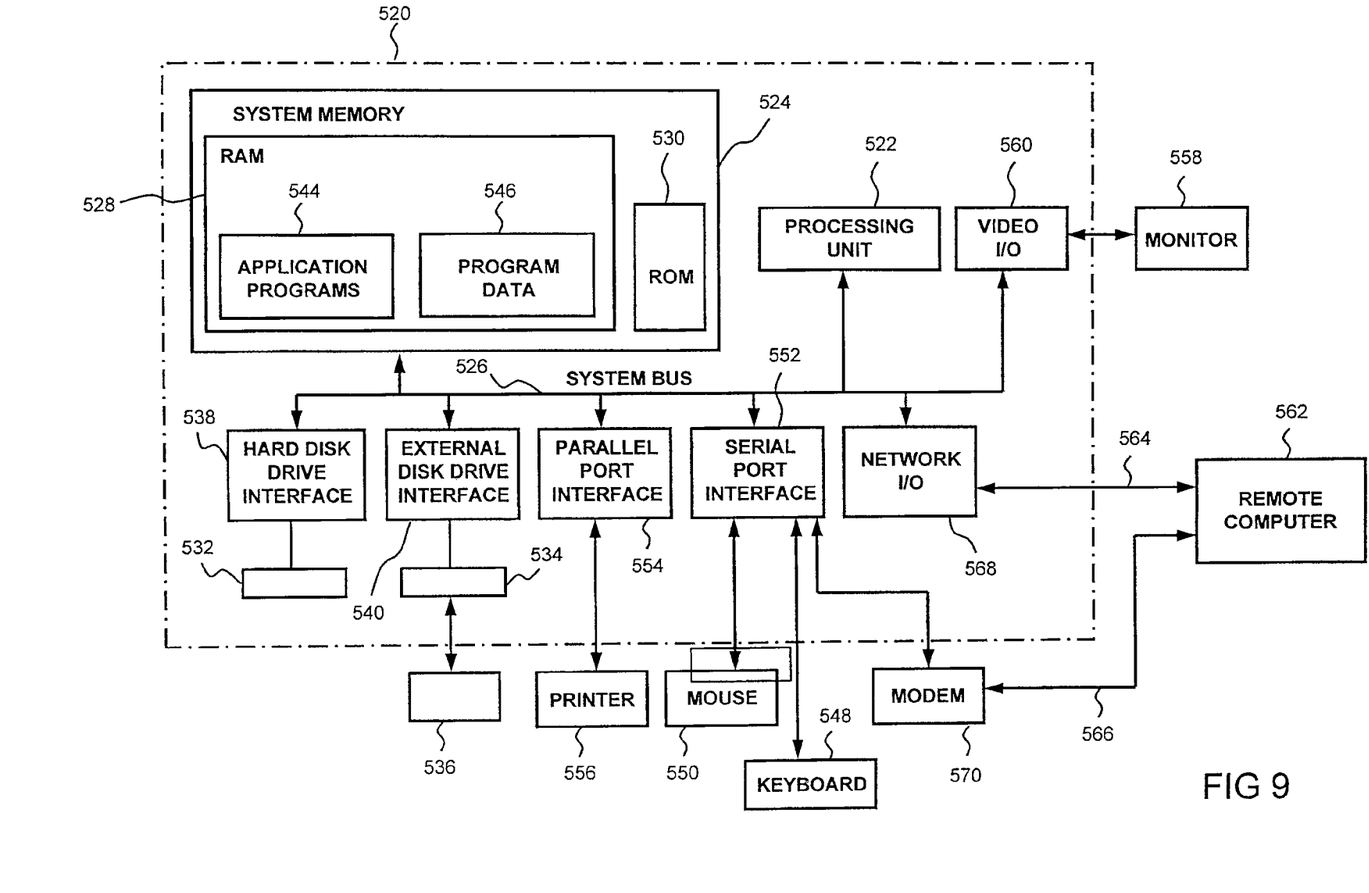
FIG. 9 shows a schematic diagram of an exemplary computer system.

FIG. 9 shows an exemplary system for implementing aspects of the invention including a general purpose computing device in the form of a conventional computing environment 520 (e.g. a personal computer, also referred to as a user computer). The conventional computing environment includes a processing unit 522, a system memory 524, and a system bus 526. The system bus couples various system components including the system memory 524 to the processing unit 522. The processing unit 522 may perform arithmetic, logic and/or control operations by accessing the system memory 524. The system memory 524 may store information and/or instructions for use in combination with the processing unit 522. The system memory 524 may include volatile and non-volatile memory, such as a random access memory (RAM) 528 and a read only memory (ROM) 530. A basic input/output system (BIOS) containing the basic routines that helps to transfer information between elements within the personal computer 520, such as during start-up, may be stored in the ROM 530. The system bus 526 may be any of several types of bus structures including a memory bus or memory controller, a peripheral bus, and a local bus using any of a variety of bus architectures.

The personal computer 520 may further include a hard disk drive 532 for reading from and writing to a hard disk (not shown), and an external disk drive 534 for reading from or writing to a removable disk 536. The removable disk may be a magnetic disk for a magnetic disk driver or an optical disk such as a CD ROM for an optical disk drive. The hard disk drive 532 and the external disk drive 534 are connected to the system bus 526 by a hard disk drive interface 538 and an external disk drive interface 540, respectively. The drives and their associated computer-readable media provide nonvolatile storage of computer readable instructions, data structures, program modules and other data for the personal computer 520. The data structures may include relevant data for the implementation of the method of monitoring and tracking application usage, as described above. The relevant data may be organized in a database, for example a relational or object database.

Although the exemplary environment described herein employs a hard disk (not shown) and an external disk 536, it should be appreciated by those skilled in the art that other types of computer readable media which can store data that is accessible by a computer, such as magnetic cassettes, flash memory cards, digital video disks, random access memories, read only memories, and the like, may also be used in the exemplary operating environment.

A number of program modules may be stored on the hard disk, external disk 536, ROM 530 or RAM 528, including an operating system (not shown), one or more application programs 544, other program modules (not shown), and program data 546. The application programs may include at least a part of the functionality as depicted in FIGS. 1 to 8.

A user may enter commands and information, as discussed below, into the personal computer 520 through input devices such as keyboard 548 and mouse 550. Other input devices (not shown) may include a microphone (or other sensors), joystick, game pad, scanner, or the like. These and other input devices may be connected to the processing unit 522 through a serial port interface 552 that is coupled to the system bus 526, or may be collected by other interfaces, such as a parallel port interface 554, game port or a universal serial bus (USB). Further, information may be printed using printer 556. The printer 556 and other parallel input/output devices may be connected to the processing unit 522 through parallel port interface 554. A monitor 558 or other type of display device is also connected to the system bus 526 via an interface, such as a video input/output 560. In addition to the monitor, computing environment 520 may include other peripheral output devices (not shown), such as speakers or other audible output.

The computing environment 520 may communicate with other electronic devices such as a computer, telephone (wired or wireless), personal digital assistant, television, or the like. To communicate, the computer environment 520 may operate in a networked environment using connections to one or more electronic devices. FIG. 9 depicts the computer environment networked with remote computer 562. The remote computer 562 may be another computing environment such as a server computer, a router, a network PC, a peer device or other common network node, and may include many or all of the elements described above relative to the computing environment 520. The logical connections depicted in FIG. 9 include a local area network (LAN) 564 and a wide area network (WAN) 566. Such networking environments are commonplace in offices, enterprise-wide computer networks, intranets and the Internet and may particularly be encrypted.

When used in a LAN networking environment, the computing environment 520 may be connected to the LAN 564 through a network I/O 568. When used in a WAN networking environment, the computing environment 520 may include a modem 570 or other means for establishing communications over the WAN 566. The modem 570, which may be internal or external to computing environment 520, is connected to the system bus 526 via the serial port interface 552. In a networked environment, program modules depicted relative to the computing environment 520, or portions thereof, may be stored in a remote memory storage device resident on or accessible to remote computer 562. Furthermore, other data relevant to of monitoring and tracking application usage (described above) may be resident on or accessible via the remote computer 562. It will be appreciated that the network connections shown are exemplary and other means of establishing a communications link between the electronic devices may be used.

The above-described computing system is only one example of the type of computing system that may be used to implement the method of monitoring and tracking application usage.

We claim:

1. A computer-implemented method of monitoring and tracking application usage, the method comprising:
    specifying a first interval length that is a period of time;
    determining, during a first interval of the first interval length, a first indication of an input status of whether a first user has provided a first input;
    obtaining, during the first interval of the first interval length, a first identifier of an active window in a first graphical user interface (GUI); and
    tracking the application usage by:
        obtaining a first input comparison by comparing the first indication of the input status with a previously stored indication of the input status and comparing the first identifier of the active window with a previously stored identifier of the active window; and
    selectively storing the first identifier of the active window and the first indication of the input status based on the first input comparison by only storing the first identifier of the active window and the first indication of the input status when the comparison input indicates:
        the first identifier of the active window is different from a most recently stored identifier of the active window; or the first indication of the input status is different from a most recently stored indication of the input status.

2. The method of claim 1, wherein selectively storing the first identifier of the active window and the first indication of the input status includes saving the first identifier of the active window and the first indication of the input status in a first data set comprising a first data sheet.

3. The method of claim 2, further comprising:
    specifying a second interval length that is a period of time different from the first interval length;
    determining, during a second interval of the second interval length, a second indication of an input status of whether a second user has provided a second input;
    obtaining, during the second interval of the second interval length, a second identifier of an active window in a second GUI;
    saving the second identifier of the active window of the second GUI and the second indication of the input status of the second user in a second data set comprising a second data sheet; and
    copying data of the first data set and data of the second data set into a third data set comprising a third data sheet.

4. The method of claim 3, wherein the first data sheet is located on a first computer, the second data sheet is located on a second computer and the third data sheet is located on a third computer; and
    wherein copying the data of the first data sheet and the data of the second data sheet into the third data sheet further comprises:
    opening a connection from the first computer to the third computer and copying the first data sheet to the third computer; and
    opening another connection from the second computer to the third computer and copying the second data sheet to the third computer.

5. The method of claim 2, further comprising:
    determining, during a second interval of the first interval length, a second indication of the input status of whether the first user has provided a second input;
    obtaining, during the second interval of the first interval length, a second identifier of the active window in the first GUI; and where tracking the application usage further comprises:
  obtaining a second input comparison by comparing the second identifier of the active window with the first identifier of the active window and comparing the second indication of the input status with the first indication of the input status; and
  selectively storing the second identifier of the active window and the second indication of the input status based on the second input comparison.

6. The method of claim 2, further comprising, transmitting the first data sheet to a second computer; processing the first data sheet using a macro; and consolidating information from the first data sheet with information from one or more further data sheets in order to generate a report.

7. The method of claim 1, wherein determining the first indication of the input status comprises verifying whether the first user has provided the first input using a keyboard, a navigation device, a pointing device, or any combination thereof.

8. The method of claim 1, wherein the first identifier of the active window and the first indication of the input status are not displayed in the first GUI.

9. The method of claim 1, comprising varying the first interval length according to an application being monitored, a process being performed, or both.

10. The method of claim 1, comprising specifying the first interval length as a fixed period of time.

11. The method of claim 1, further comprising automatically protecting stored data indicative of the tracking of the application usage by:
  locking one or more data cells of the stored data; or
  hiding one or more data cells of the stored data.

12. A computer system for monitoring and tracking application usage, the computer system comprising:
  a first computer including:
  a first graphical user interface (GUI) configured to display a first active window; and
  a first input device; and
    wherein the first computer is operable to:
  specify a first interval length that is a period of time;
  determine, during a first interval of the first interval length, a first indication of an input status of whether a first user has provided a first input to the first input device;
  obtain, during the first interval of the first interval length, a first identifier of the first active window; and
  track the application usage by:
    obtaining a first input comparison by comparing the first indication of the input status with a previously stored indication of the input status and comparing the first identifier of the first active window with a previously stored identifier of an active window; and
    selectively storing the first identifier of the first active window and the first indication based on the first input comparison by only storing the first identifier of the first active window and the first indication of the input status when the comparison input indicates:
      the first identifier of the first active window is different from a most recently stored identifier of the active window; or
      the first indication of the input status is different from a most recently stored indication of the input status.

13. The computer system of claim 12, wherein the first computer is operable to:
  determine, during a second interval of the first interval length, a second indication of the input status of whether the first user has provided a second input;
  obtain, during the second interval of the first interval length, a second identifier of the active window in the first GUI; and
  further track the application usage by:
    obtaining a second input comparison by comparing the second identifier of the active window with the first identifier of the first active window and comparing the second indication of the input status with the first indication of the input status; and
    selectively storing the second identifier of the active window and the second indication of the input status based on the second input comparison.

14. The computer system of claim 12, wherein the first computer is operable to:
  transmit the first data sheet to a second computer;
  process the first data sheet using a macro; and
  consolidate information from the first data sheet with information from one or more further data sheets in order to generate a report.

15. The computer system of claim 12, wherein determining the first indication of the input status comprises verifying whether the first user has provided the first input using a keyboard, a navigation device, a pointing device, or any combination thereof.

16. The computer system of claim 12, wherein the first identifier of the first active window and the first indication of the input status are not displayed in the first GUI.

17. The computer system of claim 12, wherein the first computer is operable to:
  vary the first interval length according to an application being monitored, a process being performed, or both.

18. The computer system of claim 12, where the first computer is operable to specify the first interval length as a fixed period of time.

19. The computer system of claim 12, where the first computer is operable to automatically protect stored data indicative of the tracking of the application usage by:
  locking one or more data cells of the stored data; or
  hiding one or more data cells of the stored data.

20. A computer program product comprising computer-readable instructions stored on non-transitory computer-readable medium, which, when loaded and executed on a computer system, cause the computer system to:
  specify a first interval length that is a period of time;
  determine, during a first interval of the first interval length, a first indication of an input status of whether a first user has provided a first input;
  obtain, during the first interval of the first interval length, a first identifier of an active window in a first graphical user interface (GUI); and
  track the application usage by:
    obtaining a first input comparison by comparing the first indication of the input status with a previously stored indication of the input status and comparing the first identifier of the active window with a previously stored identifier of the active window; and
  selectively storing the first identifier of the active window and the first indication of the input status based on the first input comparison by only storing the first identifier of the active window and the first indication of the input status when the comparison input indicates:
    the first identifier of the active window is different from a most recently stored identifier of the active window; or
    the first indication of the input status is different from a most recently stored indication of the input status.

21. The computer program product of claim 20, wherein the computer-readable instructions cause the computer system to selectively store the first identifier of the active window and the first indication of the input status by saving the first identifier of the active window and the first indication of the input status in a first data set, comprising a first data sheet.

22. The computer program product of claim 21, wherein the computer-readable instructions further cause the computer system to: specify a second interval length that is a period of time different from the first interval length;
determine, during a second interval of the second interval length, a second indication of an input status of whether a second user has provided a second input;
obtain, during the second interval of the second interval length, a second identifier of an active window in a second GUI;
save the second identifier of the active window in the second GUI and the second indication of the input status of the second user in a second data set, comprising a second data sheet; and
copy data of the first data set and data of the second data set into a third data set comprising a third data sheet.

23. The computer program product of claim 22, wherein the first data sheet is located on a first computer, the second data sheet is located on a second computer and the third data sheet is located on a third computer; and
wherein copying the data of the first data sheet and the data of the second data sheet into the third data sheet further comprises:
opening a connection from the first computer to the third computer and copying the first data sheet to the third computer; and
opening another connection from the second computer to the third computer and copying the second data sheet to the third computer.

24. The computer program product of claim 21, wherein the computer-readable instructions cause the computer system to:
determine, during a second interval of the first interval length, a second indication of the input status of whether the first user has provided a second input;
obtain, during the second interval of the first interval length, a second identifier of an active window in the first GUI; and
further track the application usage by:
obtaining a second input comparison by comparing the second identifier of the active window with the first identifier of the active window and comparing the second indication of the input status with the first indication of the input status; and
selectively storing the second identifier of the active window and the second indication of the input status based on the second input comparison.

25. The computer program product of claim 21, wherein the method further comprises,
transmitting the first data sheet to a second computer;
processing the first data sheet using a macro; and
consolidating information from the first data sheet with information from one or more further data sheets in order to generate a report.

26. The computer program product of claim 20, wherein determining the first indication of the input status comprises verifying whether the first user has provided the first input using a keyboard, a navigation device, a pointing device, or any combination thereof.

27. The computer program product of claim 20,
wherein the computer-readable instructions cause the computer system to vary the first interval length according to an application being monitored, a process being performed, or both.

28. The computer program product of claim 20, wherein the computer-readable instructions cause the computer system to specify the first interval length as a fixed period of time.

29. The computer program product of claim 20, wherein the computer-readable instructions cause the computer system to automatically protect stored data indicative of the tracking of the application usage by:
locking one or more data cells of the stored data; or
hiding one or more data cells of the stored data.

\* \* \* \* \*